(12) United States Patent
Cheng et al.

(10) Patent No.: US 11,906,190 B2
(45) Date of Patent: Feb. 20, 2024

(54) METERING AND DISTRIBUTION DEVICE AND METHOD BASED ON A MATCHING COEFFICIENT

(71) Applicant: Yuming Cheng, Qingdao (CN)

(72) Inventors: Yuming Cheng, Qingdao (CN); Yurong Cheng, Qingdao (CN)

( * ) Notice: Subject to any disclaimer, the term of this patent is extended or adjusted under 35 U.S.C. 154(b) by 208 days.

(21) Appl. No.: 17/291,917

(22) PCT Filed: Oct. 18, 2019

(86) PCT No.: PCT/CN2019/112061
§ 371 (c)(1),
(2) Date: May 6, 2021

(87) PCT Pub. No.: WO2020/093857
PCT Pub. Date: May 14, 2020

(65) Prior Publication Data
US 2022/0128259 A1    Apr. 28, 2022

(30) Foreign Application Priority Data
Nov. 8, 2018 (CN) .......................... 201811323016.0

(51) Int. Cl.
*F24F 110/10*    (2018.01)
*F24F 11/80*    (2018.01)
*F24F 11/49*    (2018.01)

(52) U.S. Cl.
CPC .............. *F24F 11/80* (2018.01); *F24F 11/49* (2018.01); *F24F 2110/10* (2018.01)

(58) Field of Classification Search
CPC ............. F24D 19/1009; F24D 19/1048; F24D 19/1015; G01K 17/08; G05D 23/1917; F24F 11/80; F24F 11/49; F24F 2110/10
See application file for complete search history.

(56) References Cited

U.S. PATENT DOCUMENTS

2004/0226296 A1\* 11/2004 Hanna ..................... F01K 25/08
60/671
2010/0059598 A1\* 3/2010 Lindgren ........... G05D 23/1917
236/91 E
(Continued)

FOREIGN PATENT DOCUMENTS

CN    101975416 A  \*  2/2011
CN    104214825 A  \*  12/2014

OTHER PUBLICATIONS

Liu, L., Fu, L., Wang, C. and Jiang, Y., 2009, June. A novel on-off TRV adjustment model and simulation of its thermal dynamic performance. In Building Simulation (vol. 2, pp. 109-118). (Year: 2009).\*

(Continued)

*Primary Examiner* — Alicia M. Choi
(74) *Attorney, Agent, or Firm* — Novoclaims Patent Services LLC; Mei Lin Wong (57) ABSTRACT

A distributed metering device and method based on a matching coefficient, wherein the room temperature is regulated by means of an on-off controller according to an on-off time area method based heat metering device, and heat meter for the building is distributed to heat consumers according to a ratio of the on-off control valve opening cumulative time, the building area and the radiator power to a design heat load; or multiplying the ratio of heat meter reading of each household divided by heat load per unit area of each household to heat reading of a heat meter of each household of the entire building divided by the sum of the heat load per unit area of each household by the heat meter reading of a settlement point as the user's shared heat according to a heat meter method based household metering device.

20 Claims, 3 Drawing Sheets

(56) References Cited

U.S. PATENT DOCUMENTS

| | | | | |
|---|---|---|---|---|
| 2013/0248609 | A1* | 9/2013 | Aspeslagh | F24D 19/1072 237/8 A |
| 2014/0102124 | A1* | 4/2014 | Ben-Yaacov | F24D 19/1048 62/160 |
| 2014/0183957 | A1* | 7/2014 | Duchesneau | F01K 13/006 307/64 |
| 2017/0336815 | A1* | 11/2017 | Smith, Jr. | G05D 23/1924 |
| 2022/0092500 | A1* | 3/2022 | Drees | G05B 13/021 |

OTHER PUBLICATIONS

Liu, L., Fu, L. and Jiang, Y., 2012. A new "wireless on-off control" technique for adjusting and metering household heat in district heating system. Applied Thermal Engineering, 36, pp. 202-209. (Year: 2012).*

Liu, L., Fu, L., Jiang, Y. and Guo, S., 2010. Maintaining uniform hydraulic conditions with intelligent on-off regulation. Building and environment, 45(12), pp. 2817-2822. (Year: 2010).*

Liu, M.L., Sun, L.J., Xu, L.L. and Yang, M., 2012, May. Design of the heat metering system based on on-off valve regulation technology. In 2012 International Conference on Systems and Informatics (ICSAI2012) (pp. 400-403). IEEE (Year: 2012).*

Liu, L., Fu, L. and Jiang, Y., Dec. 2015. An on-off regulation method by predicting the valve on-time ratio in district heating system. In Building Simulation (vol. 8, pp. 665-672). Tsinghua University Press. (Year: 2015).*

Privara, S., Široký, J., Ferkl, L. and Cigler, J., 2011. Model predictive control of a building heating system: The first experience. Energy and Buildings, 43(2-3), pp. 564-572. (Year: 2011).*

* cited by examiner

METERING AND DISTRIBUTION DEVICE AND METHOD BASED ON A MATCHING COEFFICIENT

BACKGROUND OF THE PRESENT INVENTION

Field of Invention

The present invention relates to a metering and distribution device and method based on a matching coefficient, which relates to the technical field of HVAC and particularly relates to the general methods of on-off time area method-based household heat metering and distribution and heat meter method-based household heat metering and distribution and then extends to the fair metering and distribution of other energy equipment and in other fields.

Description of Related Arts

The on-off time area method-based and heat meter method-based household heat metering devices and methods are selected as a heat metering and distribution device and method in JGJ173-2009 Technical specifications for heat metering of district heating system. In the China national standard Technical requirements of the heat allocation device by heating time and heating area, the principle and technical solution of heat metering and distribution is to distribute the total heat supply at the settlement point using the ratio of the product of the water supply time and the area of each household and the sum of the products of the heating time and the area of each household, as shown in the equation below:

$$q_i = Q \times \frac{A_i \times T_i}{\sum A_i \times T_i}$$

Q: the total heat metered by the building master meter at the building entrance in a set period of time (kw·h);

$A_i$: the area of the i-th household (room) in the building ($m^2$);

$T_i$: the cumulative opening time of the entrance valve of the i-th household (room) in the building in the corresponding period of time (h or time ratio);

$q_i$: the metered and distributed heat quantity of the i-th household (room) in the building in the corresponding period of time (kw·h);

$\Sigma$: i=1 to N, WHEREIN N is the total number of households in the building.

However, in use, the on-off time area method based metering has always been affected by the unauthorized heating transformation of some households. According to JGJ173-2009 Technical specification for heat metering of district heating system (P36), the disadvantage of the on-off time area method is that if the size matching of radiators is not reasonable (also refers to the unauthorized heating transformation of users), that is, when the user's position is changed (users at unfavorable positions) or the radiator is blocked, the measurements will be affected, resulting in metering errors. In addition to unreasonable size matching of radiators and unfairness or radiator blocking, the heat preservation and energy-saving transformation of the house or the increase in the use area made by the users themselves will also cause the radiator size matching to be unreasonable, which will affect the metering and distribution results.

The current solutions are given below: I, according to the documents of the Ministry of Housing and Urban-Rural Development of the People's Republic of China, the radiators shall not be removed and transformed without approval. Transforming radiators is a violation of the law to steal heat, which must be subjected to strengthened management, but the implementation effect is not good. II. Heating transformation affects the distribution, but the difference caused thereby is much smaller than that of different positions in case of heat meter method based household metering. To some extent, the difference is acceptable, so subjective acceptance means giving up the metering fairness and accuracy. III. Blockage cannot be found in time and eliminated in time. IV. As regards to the unauthorized thermal preservation and energy-saving transformation made by users to their houses (such as replacement with energy-saving doors and windows), although the original metering and distribution will be changed, this transformation will promote behavior energy saving, which is beneficial to both the country and the individuals, worthy of promotion. If users increase the area of use (such as enclosing the balcony to increase the heated area), the users will pay more, which, to a certain extent, ensures the fairness and accuracy of metering, and has the effect of heat metering.

The household heat meter method based heat metering in the prior art is realized by a flowmeter, temperature sensors for water supply and return, an integrator, etc., which are installed on the main pipe at the household entrance. The principle of heat distribution is to take product of the ratio of the heat meter reading of each household to the sum of the heat meter readings of all households in the building multiplied by the heat meter reading at the settlement point as the heat distributed to the user.

The principle of heat distribution is shown in the equation below:

$$q_i = Q \times \frac{q_{mi}}{\sum q_{mi}}$$

$q_i$—the heat distributed to the i-th user (kW·h);

$q_{mi}$—the heat metered by the heat meter at the entrance of the i-th user (kW·h);

Q—the total heat metered by the heat meter at the entrance of the building (kW·h);

$\Sigma$: i=1 to n, wherein n is the total number of households in the building.

The household heat meter method directly reflects the heat supplied to users, characterized by intuitive and simple distribution. The premise of the application of this method is that each household must be an independent horizontal system, so that it is suitable for independent household radiator systems with a common riser, hot water floor radiant heating systems, fan coils with distribution and circulation by household in centralized heating and other terminal air-conditioning equipment systems.

The heat meter is greatly different from the water meter, the electricity meter and the gas meter in metering attributes, because the actual consumption of water, electricity and gas is generally reflected when they pass through the metering instruments. However, we face a problem in heating metering that heat will be transferred and dissipated, i.e. the heat metered in heat supply will be transferred to the next or adjacent room through the space and walls of each household. Thus, it's hard to say that the heat input of each household is the quantity of heat used.

The heat meter method based heat metering is as with the on-off time area method based household heat metering. For example, in the same residential building, a residential house at the corner of the top has three or four external walls, a middle household of the building may only have one or two external walls, and the former and the latter have the same area of 100 m². If the indoor temperature of 22° C. is maintained for the two households, the top user is likely to consume heat 3-4 times than the middle household since heat is quickly dissipated from the roof and external walls. If charging is according to the household heat meter for this case, the difference between the charges to be paid by the two households probably reaches 23,000 yuan in the whole heating season. The user at the unfavorable position will naturally question the fairness of heat metering, which will affect the promotion and use of energy saving of heat metering.

In cities where household-based metering is adopted, the heating charge is generally a combination of basic heating price and metered heating price. The basic heating price is charged according to the floor area of the house, and the metered heating price is the actual quantity of heat indicated by the user's heat meter or the quantity distributed by the on-off time area method based household metering.

Many people think that in building household heat metering, an on-off time area method based metering device or a heat meter is installed for each household, so that the heat obtained by each household from the system can be metered. Even if the households have the same area and temperature, the heat consumption of the users at the favorable position is quite different from that of the users at the unfavorable position, which necessitate position correction. In this case, two heating charge methods are produced, resulting in a strange paradox, i.e., the data indicated by the household heat meters in pursuit of accuracy have to be balanced by the fuzzy position correction coefficient. Therefore, the building heat meter can reflect the heat consumption of the building as the basis for charging, while the value metered by the household heat meters cannot be directly used as the basis for charging.

A building heating design is to provide corresponding radiator equipment for each household according to the heat load of each household to ensure that each square meter of each household can reach the same design temperature. However, in the case of mismatch between the heat load of each household and heating equipment (normal in use), the data provided by both the on-off time area method based heat metering and the heat meter method based metering cannot be directly used as the basis for charging.

In addition, even if all households of a building has the same area, there is a huge difference in the heat load among the residents at different positions. So, it will be unfair to directly charge the households according to the heat meter method based household metering, which will seriously affect the promotion and application of heat meters. Therefore, those skilled in this art have been committed to developing a general method of household heat metering on the principle of equal comfort and equal charges to eliminate the unfairness in the on-off time area method based and heat meter method based household heat metering and distribution caused by unfavorable user positions and the different matching coefficients of different heating equipment.

SUMMARY OF THE PRESENT INVENTION

In view of the above-mentioned defects of the prior art, the object of the present invention is to provide a general method for measuring an on-off time and area heat generation based on heat metering in order to solve the technical problem in the prior art that metering and distribution are affected by unreasonable size matching of radiators and the unauthorized house and heating modification by users, and to perfect the heat metering technique based on the on-off time and area heat generation measurement from theory to practice.

In order to achieve the above-mentioned object, a technical solution is provided that the room temperature is regulated by means of an on-off controller based on a heat allocation by heating on-off time and heating area metering, and heat meter for the building is distributed to heat users according to a cumulative opening time based on the on-off control valve (ratio), the building area and the ratio (matching coefficient) of radiator power to heat load; i.e. to measure and apportion the total heat supply at the settlement point according to the ratio of the product of the water supply time of heating system, the initial area and the ratio (matching coefficient) of the actual radiator power to the initial heat load of each household to the sum of the products of the heating time, the area and the ratio (matching coefficient) of the actual radiator power to the initial heat load of each household, which is shown in the following formula:

$$q_i = Q \times \frac{A_i \times T_i \times X_i}{\sum A_i \times T_i \times X_i}$$

Q: the total heat metered by the master meter at the building entrance in a set period of time (kw·h);

$A_i$: the area of the i-th household (room) in the building (m²);

$T_i$: the cumulative opening time of the valve at the entrance of the i-th household (room) in the building in the corresponding period of time (h);

$X_i$: the ratio of the power of the heating equipment to the design load of the i-th household (room) in the building in the corresponding period of time, i.e., matching coefficient;

$X_i = E_i / F_i$ $E_i$: the actual radiating power of the i-th household (room) in the building in the corresponding period of time (kw);

$F_i$: the initial design heat load of the i-th household (room) in the building (kw);

$q_i$: the metered and distributed heat quantity of the i-th household (room) in the building in the corresponding period of time (kw·h);

$\Sigma A_i \times T_i \times X_i$: i=1 to n, n is the total number of households in the building, and $\Sigma$ refer to the sum of the $A_i \times T_i \times X_i$ from i to n.

In order to prevent simultaneous opening due to taking the fixed cycle as a metering period, hydraulic instability caused by simultaneous and consistent closing action, and centralized information transmission, the time required by the master meter to meter the total heat of a fixed unit is taken as a metering period.

This heat metering and distribution method can be extended to charge calculation and distribution of the centralized or household heating of other energy (gas, electricity, etc.) so that the room temperature is regulated by means of an on-off controller, and the charge of a building heat meter is distributed to heat consumers according to the on-off control valve cumulative opening time (ratio), the building area and the ratio (matching coefficient) of radiator power to heat load, as shown in the equation below;

$$q_i = Q \times \frac{A_i \times T_i \times X_i}{\sum A_i \times T_i \times X_i}$$

Q: the electricity charge, the gas charge or equipment charge metered by the master meter of the building in the set period of time (yuan);

$A_i$: the area of the i-th household (room) in the building ($m^2$);

$T_i$: the cumulative opening temperature-control time of the valve of the i-th household (room) in the building in the corresponding period of time (h or time ratio);

$X_i$: the ratio of the power of the heating equipment to the design load of the i-th household (room) in the building in the corresponding period of time, i.e., matching coefficient;

$X_i = E_i/F_i$ $E_i$: the (gear) radiating power of the i-th household (room) in the building in the corresponding period of time (kw);

$F_i$: the design heat load of the i-th household (room) in the building (kw);

$q_i$: the electricity charge, the gas charge or equipment charge distributed to the i-th household (room) in the building in the corresponding period of time (yuan);

$\Sigma A_i \times T_i \times X_i$: i=1 to n, n is the total number of households in the building.

This metering and distribution method can be extended to the metering and distribution of various paid resources and the charge distribution. Distribution is made according to the equation below:

$$q_i = Q \times \frac{A_i \times T_i \times X_i \times X_j}{\sum A_i \times T_i \times X_i \times X_j}$$

Q: the charge or consumption or distribution of a paid resource or equipment investment in a set period of time (yuan, etc.);

$A_i$: the volume or value of the i-th individual in a set period of time for a certain charge or consumption or distribution;

$T_i$: the cumulative action time of the i-th individual in a set period of time for a certain charge or consumption or distribution;

$X_i$: the matching coefficient of an item of the i-th individual in a set period of time for a certain charge or consumption or distribution;

$E_i$: the completion effect of an action of the i-th individual in a set period of time for a certain charge or consumption or distribution;

$F_i$: the rated completion effect of an action of the i-th individual in a set period of time for a certain charge or consumption or distribution;

$X_j$: some other matching coefficient (if any) of the i-th individual in a set period of time for a certain charge or consumption or distribution;

$E_j$: the completion effect of some other action of the i-th individual in a set period of time for a certain charge or consumption or distribution;

$F_j$: the rated completion effect of some other action of the i-th individual in a set period of time for a certain charge or consumption or distribution;

$\Sigma A_i \times T_i \times X_i \times X_j$: i=1 to n, in is the total number of all individuals, $X_i = E_i/F_i$, $X_j = E_j/F_j$;

$q_i$: the distributed charge or consumption or distribution (yuan, etc.) in the corresponding period of time of the i-th individual in a set period of time.

Since the above $X_i = E_i/F_i$;

Given: $q_{mi}$ the heat metered by the heat meter at the entrance of the i-th user (kW·h);

Therefore, $X_{mi}$: the matching area per unit heat load of the i-th house (room) in the building ($m^2$/kw);

i.e. $f_i$ is the matching heat load per unit area of the i-th house (room) in the building (kw/$m^2$);

i.e. $q_{mi} = T_i \times E_i$  $X_{mi} = A_i/F_i$  $f_i = F_i/A_i$

Substitute into $A_i \times T_i \times X_i = A_i \times T_i \times E_i/F_i = g_{mi} \times X_{mi} = q_{mi}/f_i$ Therefore:

$$q_i = Q \times \frac{A_i \times T_i \times X_i}{\sum A_i \times T_i \times X_i}$$

$$q_i = Q \times \frac{q_{mi} \times X_{mi}}{\sum q_{mi} \times X_{mi}}$$

$$q_i = Q \times \frac{q_{mi}/f_i}{\sum q_{mi}/f_i}$$

According to the above ideas, the object of the invention is to provide a general metering device and method based on heat meter metering, which also achieves the principle of equal comfort and equal charges, solves the metering fairness problem of users at unfavorable positions in the prior art, also solves the unfairness in the on-off time area method based and heat meter method based household heat metering and distribution caused by the different matching coefficients of different house heating equipment and improves the heat meter method-based heat metering technique from theory to practice.

In order to achieve the above-mentioned object, a technical solution is provided that each household regulates the room temperature using their own temperature regulating method and the product of the ratio of heat meter reading of each household divided by the matching heat load per unit area of each household to the heat readings of the household heat meters of the entire building divided and the sum of the matching heat load per unit area of each household by the heat meter reading of a settlement point is taken as the user's distributed heat according to a heat meter method based household metering device.

The heat distribution equation is given below:

$$q_i = Q \times \frac{q_{mi}/f_i}{\sum q_{mi}/f_i}$$

$q_i$—the heat distributed to the i-th user (kW·h);

$q_{mi}$—the heat metered by the heat meter at the entrance of the i-th user (kW·h);

$f_i$: the matching heat load per unit area of the i-th house (room) in the building (kw/$m^2$);

Q—the total heat metered by the heat meter at the entrance of the building (kW·h);

$\Sigma q_{mi}/f_i$: i=1 to n, wherein n is the total number of households in the building.

In order to prevent simultaneous opening due to taking the fixed cycle as a metering cycle, hydraulic instability caused by simultaneous and consistent closing action, and centralized information transmission, the master meter meters the total heat of a fixed unit as one metering and distribution unit, and the master meter meters the total heat of a fixed unit as one metering information transmission cycle.

This general method of heat meter metering can be extended to charge calculation and distribution of the household heating of other energy (gas, electricity, etc.), that each household regulates the room temperature using their own temperature regulating method, and the product of the ratio of electricity or gas meter reading of each household divided by heat load of each household to the readings of the household electricity or gas meters of the entire building divided by the sum of the heat load of each household and the electricity or gas meter reading of a settlement point is taken as the user's distributed heat according to an electricity or gas meter method based household metering device.

The principle of heat distribution is shown in the equation below:

$$q_i = Q \times \frac{q_{mi}/f_i}{\sum q_{mi}/f_i}$$

Where, $q_i$—the electricity meter or gas meter quantity distributed to the i-th user (kW·h or m$^3$);

$q_{mi}$—the electricity meter or gas meter quantity metered by the heat meter at the entrance of the i-th user (kW·h or m$^3$);

$f_i$: the matching heat load per unit area of the i-th house (room) in the building (kw/m$^2$);

Q—the total quantity metered by the electricity meter or gas meter at the entrance of the building (kwh or m$^3$);

$\Sigma q_{mi}/f_i$: i=1 to n, wherein n is the total number of households in the building.

This metering and distribution method can also be extended to the metering and distribution of various paid resources and work quantity in other fields and the charge distribution; and distribution is made according to the equation below:

$$q_i = Q \times \frac{q_{mi}/f_i}{\sum q_{mi}/f_i}$$

$q_i$—the paid resources or work quantity distributed by a system to the i-th individual;

$q_{mi}$—the paid resources or work metered for and used by the i-th individual;

$f_i$: the first technical index of the unit system of the i-th individual in a system;

$f_j$: the second technical index (if any) of the unit system of the i-th individual in a system;

Q—the total paid resources or work metered by a system;

$\Sigma q_{mi}/f_i$: i=1 to n, wherein n is the total number of individuals in the system.

The beneficial effects of the present invention are as below:

1. It solves the problems about distribution correction of users at unfavorable heat metering positions and about the fairness and reasonability in heat metering; and technically improves the practical application of the heat meter method based heat metering technique from theory to practice.

2. It solves the problems of hydraulic instability caused by the fixed-cycle metering and distribution and the centralized remote communication periods.

3. It solves the management problem of fair metering and charging for heating with other clean energy.

4. It solves the orientation problem with the metering and distribution fairness of various paid resources and work quantity.

The beneficial effects of the present invention are as below:

1. It solves the technical problems that metering and distribution are affected by the unreasonable size matching of radiators, the unauthorized radiator transformation of users and the unauthorized house transformation of users; the problem with the power matching of the fan coil of the central air conditioning heat metering; the technical problem with the timely finding and elimination of pipe blockage; the problems about distribution correction of users at unfavorable heat metering positions and about the fairness and reasonability in heat metering; and the unfairness in the on-off time area method based and heat meter method based household heat metering and distribution caused by the different matching coefficients of different house heating equipment, and technically improves the practical application of the on-off time area method based and heat meter method based heat metering techniques from theory to practice.

2. It solves the problems of hydraulic instability caused by the fixed-cycle metering and distribution and the centralized remote communication periods.

3. It solves the management problem of fair metering and charging for heating with other clean energy.

4. It solves the problems with the investment recovery of metering and distribution of various paid resources and work quantity as well as metering and distribution fairness of energy contract management, and solves the orientation problem with the metering and distribution fairness of various paid resources and work quantity.

BRIEF DESCRIPTION OF THE DRAWINGS

In the drawings, the same components are given the same reference marks. The drawings are not drawn to the actual scale.

In these drawings, temperature controller 1, radiator 2, electric control valve 3, heating furnace 4, building meter 5, household meter 51, building concentrator 6. The solid line indicates the water pipe line, the dotted line indicates a wire or natural gas pipe line, and the dashed line indicates the communication network line.

DETAILED DESCRIPTION OF THE PREFERRED EMBODIMENT

The multiple preferred embodiments of the present invention are described by referring to the accompanying drawings of the disclosure so as to make the technical contents more clear and easy to understand. The present invention can be embodied by many different forms of embodiments, and the protection scope of the present invention is not limited to the embodiments mentioned herein.

Figure 1:
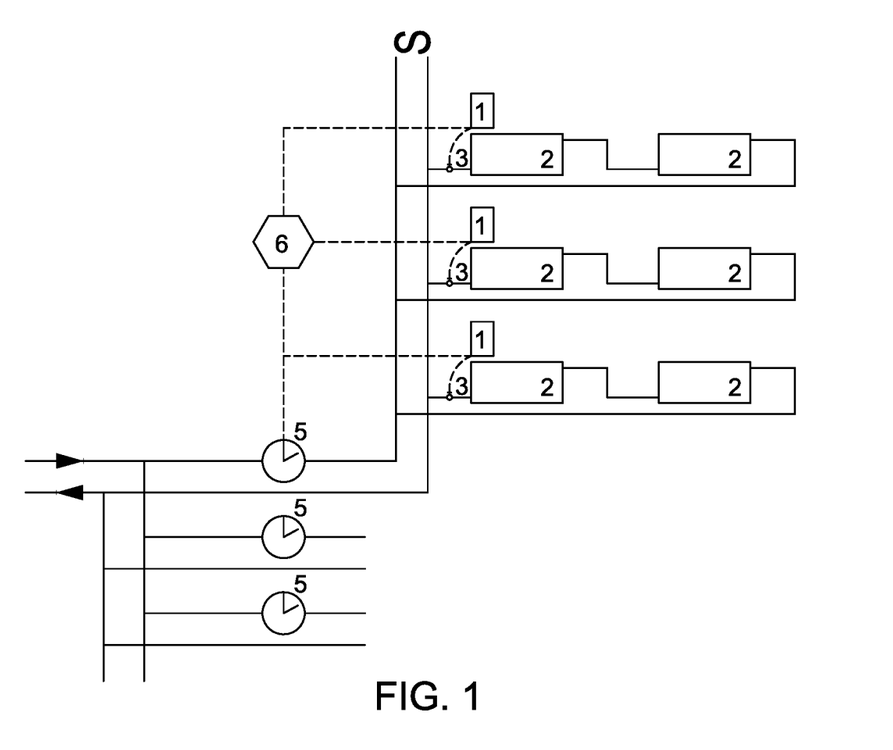
FIG. 1 is a schematic diagram of the on-off method based metering and distribution structure according to Embodiment 1 of the present invention.

1. In the on-off time area method, the ratio of the radiating equipment power to the design heat load is required to be well matched, that is, the radiating equipment power is required to be equal to the design heat load. In the present invention, the matching coefficient is 1, but in practical application, the radiating equipment power is not equal to the design heat load for various reasons, resulting in metering errors and impossibility to use the on-off time area method. The present invention provides a general technical solution of metering and distribution based on a matching coefficient that the room temperature is regulated by means of an on-off controller according to a heat allocation by heating time and heating area, and heat meter for the building is distributed to heat consumers according to the on-off control valve cumulative opening time (ratio), the building area and the ratio (matching coefficient) of radiator power to heat load; i.e. to meter and distribute the total heat supply at the settlement point by taking the ratio of the product of the water supply time of heating system, the initial heating area and the ratio (matching coefficient) of the actual radiator power to the initial heat load of each household to the sum of the products of the heating time, the area and the ratio of the actual radiator power to the initial heat load of each household as the basis, solving the problems above. As shown in FIG. 1:

1.1 If the heat load and the radiator power do not match due to design and construction, the corresponding radiator power data and the initial design heat load data can be updated and adjusted to the actual values according to the above formula before metering and use, so as to ensure the accuracy and fairness of metering.

1.2 If the user transforms the radiator without authorization and increases the power of the radiator after completion, delivery and putting into use, make an inspection before each heating metering cycle, and correct the radiator power data according to the actual increase, so that the user will be distributed more charges to ensure the fairness of metering.

1.3. If a user removes and transforms the doors and windows to increase the heat consumption area in use, causing the change in the heat load, and we still make a calculation according to the original heat load, more charges will be distributed to the user; and if a user replaces original doors and walls with more energy-saving and thermal insulation ones, less charges will be distributed to the user, which is conducive to promoting users' energy-saving transformation and behavior energy-saving.

1.4. The power output of the fan coil (radiator) of the central air conditioning has fixed models and gears. So it is impossible that its power and the heat load exactly match, which affects metering results. In this case, appropriate adjustment can be made according to the corresponding formula before use to ensure the metering accuracy. For example, the heat load of each room is different, but the power of the fan coil used is the same, and the power of the fan coil has different gears. In practical use, adjustment is made according to the actual output power of each gear. The metering accuracy will be affected if the past distributed equation is used. The thermal load of each room and the heat power will dynamically match through the correction before metering, which can ensure the accuracy and fairness of metering.

1.5 Where abnormality is found in the user's metering and distribution during use, such as the valve is always open but the set temperature cannot be reached, and the distributed charge is significantly higher or lower than that of its adjacent users, after ruling out abnormal use such as water leakage and windows opened, we can preliminarily determine whether the pipe is blocked, radiators are added without authorization, or the heated building area is increased without authorization, so that such abnormalities can be dealt with in time.

2. Where a fixed cycle time ratio is used to control the valve, the hydraulic condition will be very unstable if a certain method is not taken to actively adjust the working state distribution of the valve. Besides, the remote transmission time of metering communication is centralized. So the time required by the master meter to meter the total heat of a fixed unit is taken as a set period of time, and the time cycle of each building in each period of time is different, which solves the technical problem of hydraulic instability caused by simultaneous opening and closing actions, and also solves the problem of centralized communication time.

3. This heat metering and distribution method can be extended to charge calculation and distribution of other clean energy (gas, electricity, etc.).

Figure 2:
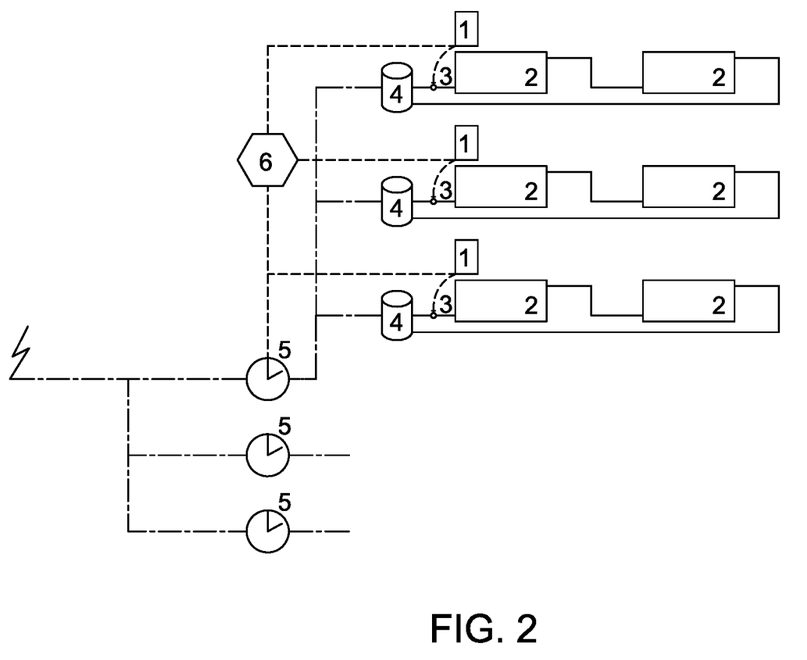
FIG. 2 is a schematic diagram of the on-off method based coal-to-electricity household heating structure according to Embodiment 3 of the present invention.

For example, in a coal-to-electricity project, each household is specially equipped with wires, air conditioners or electric heaters of customized rated power and corresponding temperature controller instead of electricity meter. A building is only equipped with a master meter, and the temperature controller of each household is online networked with the master meter, and the electricity charge of each household is calculated and distributed according to the formula, as shown in FIG. 2.

Figure 3:
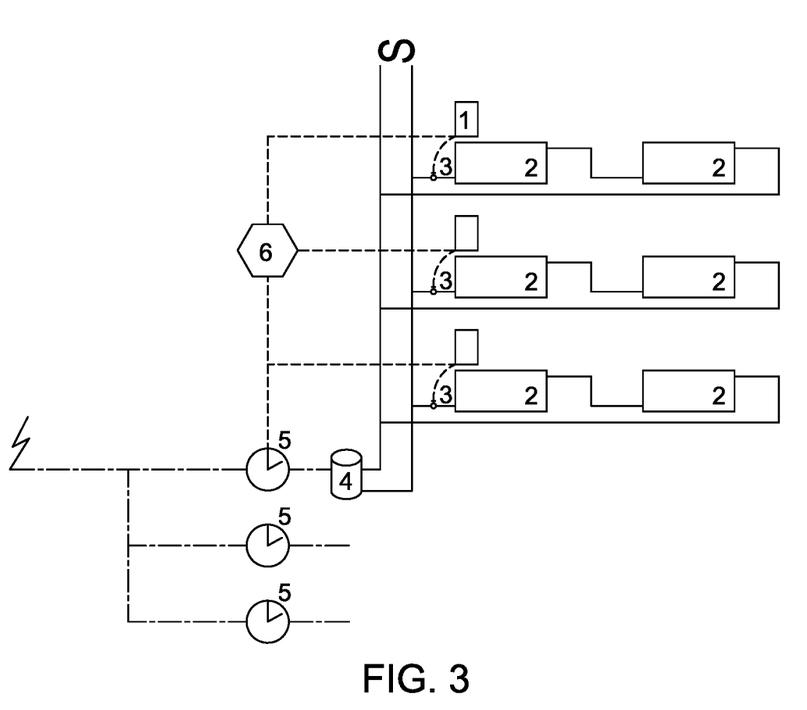
FIG. 3 is a schematic diagram of the on-off method based coal-to-gas central heating structure according to Embodiment 3 of the present invention.

For example, in a coal-to-gas project, each household still uses the original heating system, each building or quarter is equipped with a gas furnace to implement central heating, each household is equipped with a corresponding temperature controller and an electric control valve. A building is only equipped with a master meter, and the temperature controller of each household is online networked with the master meter, and the gas charge of each household is calculated and distributed according to the formula, as shown in FIG. 3.

4. This metering and distribution method can be extended to the metering and distribution of various paid resources and the charge distribution. Distribution is made according to the equation below:

4.1. Extension to other equipment (temperature control equipment, sensing equipment and remote communication equipment, etc.) and energy-saving equipment (energy-saving transformation, solar energy, wind energy, heat storage tank, heat pump, etc.). Charges can be distributed according to the continuous temperature control time of comfort intensity, to promote the application of energy contract management and the application and investment recovery of energy-saving products. Distribution is made according to the equation below:

$$q_i = Q \times \frac{A_i \times T_i \times X_i}{\sum A_i \times T_i \times X_i}$$

Q: the amount of equipment and energy saving equipment investment distributed to one year and the annual maintenance expenses or investment (yuan);

$A_i$: the area of the i-th quarter of equipment and energy saving equipment (m 2);

$T_i$: the cumulative use time of the i-th quarter of equipment and energy-saving equipment in the corresponding period of time (days);

$X_i$: the ratio of the power of the heating equipment to the design load of the i-th household (room) in the building in the corresponding period of time, i.e., matching coefficient;

$X_i = E_i/F_i$ $E_i$: the heating capacity power of the i-th quarter of equipment and energy-saving equipment in the corresponding period of time (kw);

$F_i$: the initial design heat load of the i-th quarter of equipment and energy-saving equipment (kw);

$q_i$: the charge distributed to the i-th quarter of equipment and energy-saving equipment in the corresponding period of time (yuan);

$\Sigma A_i \times T_i \times X_i$: i=1 to n, wherein n is the number of quarters (or buildings) served by equipment and energy-saving equipment. $\Sigma Ai \times Ti \times Xi$ refers to the sum from i=1 (i.e. $A_1 \times T_1 \times X_1$) to i=n (i.e. $A_n \times T_n \times X_n$).

4.2. This metering and distribution method can be extended to the charge distribution of energy-saving service; and the energy-saving service investment recovery amount of each household is calculated and distributed according to the equation below.

$$q_i = Q \times \frac{A_i \times T_i \times X_i}{\sum A_i \times T_i \times X_i}$$

Q: the amount of investment increase in energy-saving service distributed to one year and the annual maintenance expenses or investment (yuan);

$A_i$: the area of the i-th quarter of energy-saving service (m²);

$T_i$: the cumulative temperature control time of the i-th quarter of energy-saving service in the corresponding period of time (days);

$X_i$: the ratio of the power of the heating equipment to the design load of the i-th quarter of energy-saving service in the corresponding period of time, i.e., matching coefficient;

$X_i = E_i/F_i$ $E_i$: the heating capacity power of the i-th quarter of energy-saving service in the corresponding period of time (kw);

$E_i$: the design heat load of the i-th quarter of energy-saving service (kw);

$q_i$: the charge distributed to the i-th quarter of energy-saving service in the corresponding period of time (yuan);

$\Sigma Ai \times Ti \times Xi$: i=1 to n, wherein n is the number of quarters (or buildings) of energy-saving service. $\Sigma Ai \times Ti \times Xi$ refers to the sum from i=1 (i.e. $A_1 \times T_1 \times X_1$) to i=n (i.e. $A_n \times T_n \times X_n$).

4.3. This metering and distribution method can be extended to the calculation of equity dividend distribution and investment recovery.

$$q_i = Q \times \frac{A_i \times T_i \times X_i}{\sum A_i \times T_i \times X_i}$$

Q: the profit of a company in a set period of time (yuan);

$A_i$: the share capital of the i-th shareholder of a company in a set period of time (shares);

$T_i$: the time in the account of the share capital of the i-th shareholder of a company in a set period of time;

$X_i$: the matching coefficient of work completed in a corresponding period of time of the i-th shareholder of a company in a set period of time;

$X_i = E_i/F_i$ $E_i$: the effect of work completed in a corresponding period of time of the i-th shareholder of a company in a set period of time (such as sales, service frequency and satisfaction);

$E_i$: the rated completion effect of work of the i-th shareholder of a company in a set period of time;

$q_i$: the profit distributed to the i-th shareholder in the corresponding period of a company in a set period of time (yuan);

$\Sigma Ai \times Ti \times Xi$: i=1 to n, wherein n is the total number of shareholders of a company in a set period of time. $\Sigma Ai \times Ti \times Xi$ refers to the sum from i=1 (i.e. $A_1 \times T_1 \times X_1$) to i=n (i.e. $A_n \times T_n \times X_n$).

4.4. This metering and distribution method can be extended to the calculation of distribution of corporate income, etc.

$$q_i = Q \times \frac{A_i \times T_i \times X_i \times X_j}{\sum A_i \times T_i \times X_i \times X_j}$$

Q: the distributable quantity of a company in a set period of time (yuan or work quantity);

$A_i$: the rank coefficient of the i-th employee of a company in a set period of time;

$T_i$: the cumulative working time in the corresponding period of time of the i-th employee in a company in a set period of time (different limits can be set for employees of different ranks);

$X_i$: the matching coefficient of completion effect of work performance in the corresponding period of time of the i-th employee in a company in a set period of time;

$X_i = E_i/F_i$ $E_i$: the completion effect of work performance in a corresponding period of time of the i-th employee of a company in a set period of time (such as sales and work quantity);

$F_i$: the rated completion effect of work performance in a corresponding period of time of the i-th employee of a company in a set period of time;

$X_j$: the matching coefficient of the completion effect of some other work performance in a corresponding period of time of the i-th employee of a company in a set period of time (such as special work reward, innovation and creation, benefit contribution, emergency handling and work quantity);

$X_j = E_j/F_j$ $E_j$: the completion effect of some other work performance in a corresponding period of time of the i-th employee of a company in a set period of time (such as sales and work quantity);

$F_j$: the rated completion effect of some other work performance in a corresponding period of time of the i-th employee of a company in a set period of time;

$\Sigma A_i \times T_i \times X_i \times X_j$: i=1 to n, wherein n is the total number of participants of a company in a set period of time.

$q_i$: the income distributed to the i-th employee in a corresponding period of time of a company in a set period of time (yuan or work quantity);

4.5. This metering and distribution method can be extended to the calculation of incentives and subsidies for promotion of energy saving products encouraged by the government, as shown in the equation below:

$$q_i = Q \times \frac{A_i \times T_i \times X_i \times X_j}{\sum A_i \times T_i \times X_i \times X_j}$$

Q: the total subsidies and incentives for new energy vehicles in a certain year (yuan, calculated from the economic and environmental benefits of using all new energy vehicles);

$A_i$: the model cost of the i-th new energy vehicle in a certain year (such as 100,000 or 200,000 yuan);

$T_i$: the cumulative vehicle kilometers traveled (VKT) or time of the i-th new energy vehicle in a certain year (km, different time or VKT limits can be set);

$X_i$: the matching coefficient of continuous VKT performance of the i-th new energy vehicle in a year; $X_i=E_i/F_i$ $E_i$: the actual average continuous VKT or daily average travelled distance (km) of the i-th new energy vehicle in a certain year;

$F_i$: the rated standard average continuous VKT or daily average travelled distance (km) of the i-th new energy vehicle in a certain year;

$X_j$: the matching coefficient of a performance of the i-th new energy vehicle in a certain year; $X_j=E_j/F_j$ $E_j$: the j-th performance of the i-th new energy vehicle in a certain year (energy density, fast charging rate, fuel saving ratio, etc.);

$F_j$: the j-th rated performance of the i-th new energy vehicle in a certain year;

$\Sigma A_i \times T_i \times X_i \times X_j$: i=1 to n, wherein n is the number of all new energy vehicles.

Figure 4:
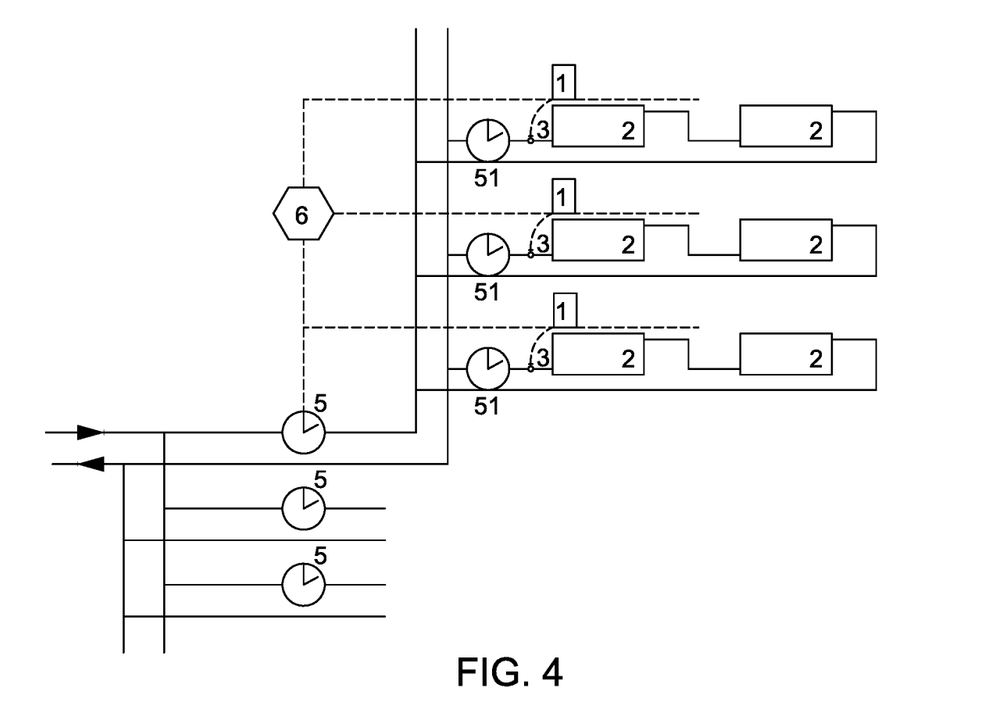
FIG. 4 is a schematic diagram of the heat meter method based metering and distribution structure according to Embodiment 6 of the present invention.

$q_i$: the subsidy or incentive for the i-th new energy vehicle in a certain year (yuan);

5. In the general heating design of a building, each household is equipped with the corresponding radiator equipment according to the heat load of each household, in order to ensure that each square meter of each household can reach the same design temperature. In the heat meter method based heat metering, even if each household in a building has the same area, it is provided with the radiator equipment whose power is greatly different due to the different position. Even if each household reaches the same temperature and comfort, the actual heat unloaded by each household is also greatly different; therefore, it will be a great unfair to take the unloaded heat of each household (the reading of the heat meter of each household) as the heat metering value of each household. Besides, it is impossible to completely eliminate such factors as unfavorable position in practice and ensure that the same heating equipment is provided for the heat load per square meter of each household. Therefore, only when the reading of the heat meter of each household corresponds to the matching heat load per unit area of each household, can we guarantee to achieve the purpose of equal comfort, equal metering and equal charging per square meter of each household; each household regulates the room temperature using their own temperature regulating method, and the product of the ratio of heat meter reading of each household divided by initial heat load per unit area of each household to the heat reading of the household heat meters of the entire building divided by the sum of the initial heat load per unit area of each household and the heat meter reading of a settlement point is taken as the user's distributed heat according to a heat meter method based household metering device, as shown in FIG. 4:

5.1. The initial design heat load is the initial design value per unit area in the house design. If there is any change in the construction, the design heat load data will be updated and adjusted according to the actual change, so that at the time of completion and delivery, the standard of initial heat load per unit area of metering will be corresponding, and the fairness of metering will be guaranteed.

5.2. If a user transforms the radiator without authorization after the completion and delivery of the project, for example increasing the radiator power, as long as the heat meter is not interfered, the heating rate will be faster, but the value of the heat metering will not change, which ensures the absolute fairness of the metering.

5.3. If a user removes and transforms the doors and windows to increase the heat consumption area in use, causing the change in the initial heat load, and we still make a calculation according to the original heat load per unit area, more charges will be distributed to the user because of the increase in the heat consumption area and more heat consumption; and if a user replaces original doors and walls with more energy-saving and thermal insulation ones, less charges will be distributed to the user, which is conducive to promoting users' energy-saving transformation and behavior energy-saving.

5.4. The power output of the fan coil (radiator) of the central air conditioning has fixed models and gears. The same radiator power can correspond to the rooms of different heat loads, also ensuring the metering accuracy. For example, the heat load of each room is different, but the power of the fan coil used is the same. The metering accuracy will be affected if the past metering and distribution equation based on the heat meter method is used. The method according to the present invention ensure the accuracy and fairness of metering.

5.5. Where abnormality is found in the user's metering and distribution during use, for example the sum of the heat meter readings of all households is not the same as the reading of the master meter, or a household fails to reach the set temperature all the time, or the distributed charge is significantly higher or lower than that of its adjacent users, after ruling out abnormal use such as water leakage and windows opened, we can preliminarily determine that heat meters or pipes have faults, so that such abnormalities can be dealt with in time.

6. Where a fixed cycle time ratio is used to control the valve to regulate the temperature of each household, the hydraulic condition will be very unstable if a certain method is not taken to actively adjust the working state distribution of the valve. Now metering information is transmitted online in real time and intelligently. If the valve is controlled to transmit information according to the fixed cycle time ratio, the remote transmission time of each household will be very centralized. So the time required by the master meter to meter the total heat of a fixed unit is taken as a set period of time and the time cycle of each building in each period of time is different, which solves the technical problem of hydraulic instability caused by simultaneous opening and closing actions and also solves the problem of centralized communication time.

7. This heat metering and distribution method can be extended to charge calculation and distribution of other clean energy (gas, electricity, etc.).

For example, in a coal-to-electricity or coal-to-gas project, each household still uses the original heating system, each building or quarter is equipped with an electric or gas furnace to implement heating, each household is equipped with a corresponding temperature controller and an electric control valve. A building is only equipped with a master meter, and the temperature controller of each household is online networked with the master meter, and the electricity or gas charge of each household is calculated and distributed according to the formula, as shown in FIG. 4.

Figure 5:
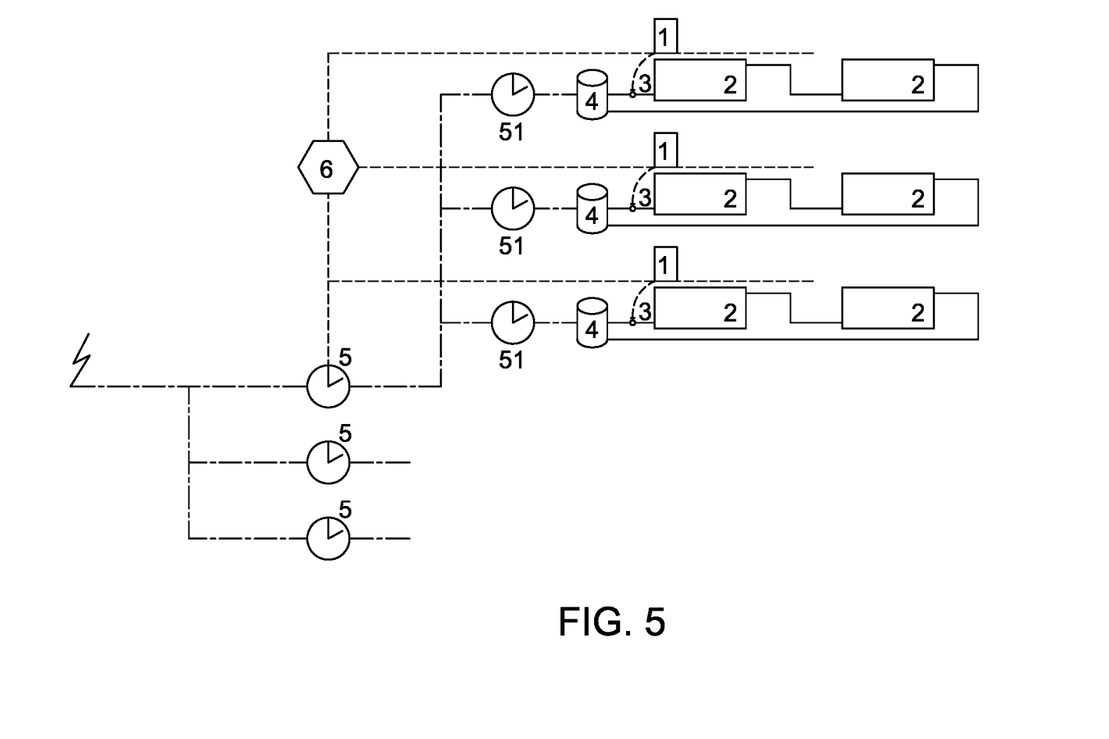
FIG. 5 is a schematic diagram of the coal-to-electricity household heating structure according to Embodiment 8 of the present invention.

For example, in a coal-to-electricity or coal-to-gas project, each household is specially equipped with wires and pipes, air conditioners or electric heaters of customized rated power and corresponding temperature controller. Each household is equipped with a meter, a building is only equipped with a master meter, and the temperature controller of each household is online networked with the master meter, and the charge of each household is calculated and distributed according to the formula, as shown in FIG. 5.

8. This metering and distribution method can also be extended to the metering and distribution of various paid resources and work items in other fields and the charge calculation and distribution; and distribution is made according to the equation below:

8.1. Extension to other equipment (temperature control equipment, sensing equipment and remote communication equipment, etc.) and energy-saving equipment (energy-saving transformation, solar energy, wind energy, heat storage tank, heat pump, etc.). Charges can be distributed according to the operation intensity, to promote the application of energy contract management and the application and investment recovery of energy-saving products. Distribution is made according to the equation below:

$$q_i = Q \times \frac{q_{mi}/f_i}{\sum q_{mi}/f_i}$$

Where, $q_i$: —the charge distributed to the i-th quarter of equipment and energy-saving equipment in the corresponding period of time (yuan);

$q_{mi}$—the quantity metered by the heat meter, electricity meter or gas meter at the entrance of the i-building quarter (kW·h or m$^3$);

$f_i$: —the matching heat load per unit area of the i-th quarter of the equipment and energy-saving equipment (kw/m$^2$);

Q—the amount of equipment and energy saving equipment investment distributed to one year and annual maintenance expenses or investment (yuan);

$\sum q_{mi}/f_i$:—i=1 to n, wherein n is the number of quarters (or buildings) served by equipment and energy-saving equipment.

8.2. This metering and distribution method can be extended to the distribution calculation of total income, total performance, total resources or total work quantity of the branches of a company.

$$q_i = Q \times \frac{q_{mi}/f_i}{\sum q_{mi}/f_i}$$

$q_i$: —the distribution of the resources, performance, income or work quantity of the i-th branch of a company;

$q_{mi}$—the actual value of the resources, performance, income or work quantity of the i-th branch of a company;

$f_i$: —the weight of load per staff member of the i-th branch of a company;

Q: —the total income, total performance, total resources or total work quantity of a company;

$\sum q_{mi}/f_i$: i=1 to n, wherein n is the number of branches in the company.

For example, for an insurance company having two branches, the performance index per staff member of the branch in the urban area is 20,000 yuan, and the actual performance is 150,000 yuan; the performance index per staff member of the branch in the suburb is 10,000 yuan, and the actual performance is 150,000 yuan. The total performance is 300,000 yuan, and the bonus is 60,000 yuan. According to the past distribution principle, 30,000 yuan is distributed to each branch, so no one is willing to go to the suburban branch, which is not conducive to the promotion of the company's business. Therefore, according to the formula above, 20,000 yuan is distributed to the urban branch and 40,000 yuan is distributed to the suburban branch. In another scenario, the performance index per staff member of the branch in the urban area is 20,000 yuan, and the actual performance is 200,000 yuan; the performance index per staff member of the branch in the suburb is 10,000 yuan, and the actual performance is 100,000 yuan. The total performance is 300,000 yuan. According to the formula above, a bonus of 30,000 yuan is distributed to the urban branch and 30,000 yuan is distributed to the suburban branch. In another scenario, the performance index per staff member of the branch in the urban area is 20,000 yuan, and the actual performance is 100,000 yuan; the performance index per staff member of the branch in the suburb is 10,000 yuan, and the actual performance is 200,000 yuan. The total performance is 300,000 yuan. According to the formula above, a bonus of 12,000 yuan is distributed to the urban branch and 48,000 yuan is distributed to the suburban branch. Therefore, as long as the index is reasonable and fair, has an orientation role, and safeguards the overall interests of the company, the distribution result will be fair and reasonable. Each branch can follow the formula above in distribution to its staff members.

|  | Urban area | Suburb |  | Urban area | Suburb |  | Urban area | Suburb |
| --- | --- | --- | --- | --- | --- | --- | --- | --- |
| $q_{mi}$ | 15 | 15 | $q_{mi}$ | 20 | 10 | $q_{mi}$ | 10 | 20 |
| $f_i$ | 1 | 2 | $f_i$ | 1 | 2 | $f_i$ | 1 | 2 |
| Q | 6 | 6 | Q | 6 | 6 | Q | 6 | 6 |
| $q_i$ | 2 | 4 | $q_i$ | 3 | 3 | $q_i$ | 1.2 | 4.8 |

For example, as for a branch, the performance index per senior employee is 10,000 yuan, and the actual performance of senior employees is 150,000 yuan; the performance index per new employee is 20,000 yuan, and the actual performance of new employees is 150,000 yuan. The total performance is 300,000 yuan. The distribution according to the past distribution principle each branch is not conducive to the guidance or help of senior employees to new employees. Therefore, according to the formula above, 200,000 yuan is distributed to the senior employees and 100,000 yuan is distributed to the new employees. In another scenario, the performance index per senior employee is 10,000 yuan, and the actual performance is 200,000 yuan; the performance index per new employee is 20,000 yuan, and the actual performance is 100,000 yuan. The total performance is 300,000 yuan. According to the formula above, 240,000 yuan is distributed to the senior employees and 60,000 yuan is distributed to the new employees. In another scenario, the performance index per senior employee is 10,000 yuan and the actual performance is 100,000 yuan; the performance index per new employee is 20,000 yuan, and the actual performance is 200,000 yuan. The total performance is 300,000 yuan. According to the formula above, 150,000 yuan is distributed to the senior employees and 150,000 yuan is distributed to the new employees. Therefore, as long as the index is reasonable and fair and has an orientation role, the distribution results will be fair and reasonable and has an orientation role, and so on.

|  | Senior employees | New employees |  | Senior employees | New employees |  | Senior employees | New employees |
|---|---|---|---|---|---|---|---|---|
| $q_{mi}$ | 15 | 15 | $q_{mi}$ | 20 | 10 | $q_{mi}$ | 10 | 20 |
| $f_i$ | 1 | 2 | $f_i$ | 1 | 2 | $f_i$ | 1 | 2 |
| Q | 30 | 30 | Q | 30 | 30 | Q | 30 | 30 |
| $q_i$ | 20 | 10 | $q_i$ | 24 | 6 | $q_i$ | 15 | 15 |

It can be seen from the above that the adjustment and orientation function of the unit index of this distribution method can fairly mobilize the enthusiasm of staff members, encourage people to work in suburban branches and develop the market and maximize the retention of senior employees and the motivation of new employees. Through the adjustment of unit index, the company's overall goal is achieved and the management right is delegated to the distribution units, which reduces the contradictions in the management and distribution.

8.3. This metering and distribution method can be extended to the metering and distribution of political, military and economic resources; and the resources of each unit is calculated and distributed according to the equation below.

$$q_i = Q \times \frac{q_{mi}/f_i}{\sum q_{mi}/f_i}$$

$q_i$: —the resources or work quantity metered and distributed to the i-th unit of a system (unit of resources or work quantity);

$q_{mi}$—the actual resources or work quantity metered and distributed to the i-th unit of a system (unit of resources or work quantity);

$f_i$: —the weight of load of the i-th unit of a system;

Q: —the meterable and distributable resources or work quantity of a system in a corresponding period of time;

$\Sigma q_{mi}/f_i$: —i=1 to n, wherein n is the number of units in the system.

The tables below are the distribution of various resources, which is determined according to the number of students in school in 2016, and calculated and distributed according to the formula above.

TABLE 1

Distribution of educational resources (investment by tuition investment)

|  | Primary 47% | Secondary 32% | Skilled workers 8% | Undergraduates 12% | Graduates 1% |
|---|---|---|---|---|---|
| Students in school (million) $q_{mi}$ | 100 | 67 | 17 | 26 | 2 |
| Investment in education $f_i$ | 1 | 2 | 3 | 4 | 5 |
| Total investment Q | 100 | 100 | 100 | 100 | 100 |
| Distribution percentage $q_i$ | 68.5 | 22.9 | 3.9 | 4.5 | 0.3 |

TABLE 2

Distribution of education resources (by teacher input)

|  | Primary 47% | Secondary 32% | Skilled workers 8% | Undergraduates 12% | Graduates 1% |
|---|---|---|---|---|---|
| Students in school (million) $q_{mi}$ | 100 | 67 | 17 | 26 | 2 |
| Teacher-student ratio $f_i$ | 24 | 18 | 12 | 12 | 6 |
| Total input Q | 100 | 100 | 100 | 100 | 100 |
| Distribution percentage $q_i$ | 35.3 | 31.5 | 12.0 | 18.4 | 2.8 |

TABLE 3

Distribution of educational resources (by results orientation)

|  | Primary 47% | Secondary 32% | Skilled workers 8% | Undergraduates 12% | Graduates 1% |
|---|---|---|---|---|---|
| Students in school (million) $q_{mi}$ | 100 | 67 | 17 | 26 | 2 |
| Ranking of education results $f_i$ | 16 | 8 | 4 | 2 | 1 |
| Total resources Q | 100 | 100 | 100 | 100 | 100 |
| Distribution percentage $q_i$ | 18.5 | 24.7 | 12.5 | 38.4 | 5.9 |

TABLE 4

Distribution of university education resources (by teacher input)

|  | University 1 | University 2 | University 3 | University 4 | University 5 |
|---|---|---|---|---|---|
| Personnel percentage $q_{mi}$ | 30 | 20 | 20 | 20 | 10 |
| Teacher-student ratio $f_i$ | 18 | 15 | 12 | 9 | 6 |
| Total resources Q | 100 | 100 | 100 | 100 | 100 |
| Distribution percentage $q_i$ | 19.5 | 15.6 | 19.5 | 26.0 | 19.5 |

TABLE 5

Distribution of university R & D resources (by results orientation)

|  | University 1 | University 2 | University 3 | University 4 | University 5 |
|---|---|---|---|---|---|
| Personnel percentage $q_{mi}$ | 30 | 20 | 20 | 20 | 10 |
| By ranking $f_i$ | 5 | 4 | 3 | 2 | 1 |

TABLE 5-continued

Distribution of university R & D resources (by results orientation)

|  | University 1 | University 2 | University 3 | University 4 | University 5 |
|---|---|---|---|---|---|
| Scientific research resources Q | 100 | 100 | 100 | 100 | 100 |
| Distribution percentage $q_i$ | 15.9 | 13.3 | 17.7 | 26.5 | 26.5 |

It can be seen from Table 1 above that different weights are given to schools of different stages depending on the investments for different stages. Local education subsidies can be distributed according to this table to better guarantee the education of the poor.

It can be seen from Table 2 above that different weights are given to schools of different stages depending on the teacher-to-student ratio. Education input can be distributed according to this table, so as to better guarantee the effective distribution of existing teachers.

It can be seen from Table 3 above that different weights are given to schools of different stages depending on the requirements for education results. Total education resources can be distributed according to this table, so as to better guarantee the early and quick achievement of desirable results.

It can be seen from Table 4 above that different weights are given to schools of different classes depending on the university teachers. University input can be distributed according to this table, so as to better guarantee the input of key colleges and university.

It can be seen from Table 5 above that different weights are given to schools of different classes depending on the class of the R&D capability of universities. Scientific and research development funds can be distributed according to this table to better guarantee the effective utilization and stable results of scientific and research development funds.

Distribution of military resources (strategic deterrence)

|  | Armed Police | Army | PLA Navy | Air Force | PLA Rocket Force |
|---|---|---|---|---|---|
| Personnel percentage $q_{mi}$ | 30 | 40 | 10 | 15 | 5 |
| Strategic deterrence by ranking $F_i$ | 5 | 4 | 2 | 3 | 1 |
| Total resources Q | 100 | 100 | 100 | 100 | 100 |
| Distribution percentage $q_i$ | 19.4 | 32.3 | 16.1 | 16.1 | 16.1 |

Distribution of military resources (weaponry and personnel of unit investment)

|  | Armed Police | Army | PLA Navy | Air Force | PLA Rocket Force |
|---|---|---|---|---|---|
| Personnel percentage $q_{mi}$ | 30 | 40 | 10 | 15 | 5 |
| Unit investment $F_i$ | 3 | 1 | 0.2 | 0.3 | 0.4 |
| Total resources Q | 100 | 100 | 100 | 100 | 100 |
| Distribution percentage $q_i$ | 6.2 | 24.6 | 30.8 | 30.8 | 7.7 |

It can be seen from Table 6 above that different weights are given to military services depending on the strategic deterrence ranking. Military resources can be distributed according to this table, so as to better guarantee the matching of the military resources distributed and the overall strategic deterrence.

It can be seen from Table 7 above that different weights are given to military services depending on the number of people per 100,000 yuan of each military service. Weaponry investments can be distributed according to this table to better guarantee the matching of the weaponry investment distributed and the number of people.

8.4. This metering and distribution method can be extended to the metering and distribution of various compensations of legal cases for which a final decision on a verdict has been made and the expense distribution; Distribution is made according to the equation below:

$$q_i = Q \times \frac{qm_i/f_i}{\sum q_{mi}/f_i}$$

$q_i$—the paid responsibility distributed to the i-th individual in a case;
$q_{mi}$—the loss or gain of the i-th individual in a case;
$f_i$: the cost of the i-th individual in a system to avoid a case;
Q—the total compensation loss or gain of a case;
$\Sigma q_{mi}/f_i$: i=1 to n, wherein n is the total number of individuals in the system.

For example, in the United States v. Carroll towing Co., the U.S. government's barge broke free due to the pier operation of the Towing Co., floated down the river and hit a tanker, but no one on the tanker found the hitting. The barge was damaged and 21 hours later sank together with the valuable cargo on it. The government sued the Towing Co. for compensation. Judge Hand also wrote his idea in a formulation. He recorded the cost to avoid the accident as B, the probability of the accident occurrence as P, and the losses caused by the accident as L. Then, the condition for the owner of the ship to bear the responsibility is that the government's cost B to avoid the accident is less than the product of the probability of the accident occurrence P by the losses caused by the accident L. According to this formulation, Judge Hand ruled that although the Carroll towing Co. was wrong and the tanker company was not conscientious, the government should take care of the cargo of a huge value and decided that the towing Co. and the tanker did not have to compensate the government for the losses. According to the above formulation, the losses borne by all parties are calculated as shown in Table 1. In this accident, if the government's losses account for 95%, the losses of the towing Co. account for 1% (the towing Co. has no direct losses, but the cost of follow-up handling and arrangement accounts for some part), and the tanker's damage accounts for 4% of the total losses (the cost of follow-up handling and arrangement also accounts for some part), so as long as the cost of each party to avoid the losses is determined to be 1, the losses calculated to be borne is the same as the judge's judgment, as shown in Table 1.

If the government sent personnel to press the barge, the cost is 9 times that of the others. The calculation of the losses each party bear is shown in FIG. 2. The towing Co. pays 5.4% to the government and the tanker company pays 21.7% to the government, which is fair and reasonable and will not cause the parties to escalate the situation, and will facilitate the calculation of their losses.

When it is not easy to judge whether it is the cost to avoid the losses, the relative cost to avoid the losses can be adopted, for example, the ratio of the non-fault party to the fault party is 9:1, the ratio of the non-fault party to the party in violation of regulations is 99:1, the ratio of the non-fault party to the party in violation of compulsory specifications is 999:1, the ratio of the non-fault party to the party breaking the law is 9999:1, and the ratio of the party in violation of regulations to the party breaking the law is 99:1, which greatly facilitates the definition and judgement.

TABLE 1

|  | Government | Towing Co. | Tanker |
| --- | --- | --- | --- |
| Percentage of each party's loss in the total losses $q_{mi}$ | 95 | 1 | 4 |
| Cost to avoid the losses $f_i$ | 1 | 1 | 1 |
| Total losses Q | 100 | 100 | 100 |
| Percentage to be borne by each party | 95.0 | 1.0 | 4.0 |

TABLE 2

|  | Government | Towing Co. | Tanker |
| --- | --- | --- | --- |
| Percentage of each party's loss | 95 | 1 | 4 |
| Cost to avoid the losses $f_i$ | 9 | 1 | 1 |
| Total losses Q | 100 | 100 | 100 |
| Distribution percentage $q_i$ | 67.9 | 6.4 | 25.7 |

9. This metering and distribution method in Example 1 can be extended to the metering and distribution of various compensations of legal cases for which a final decision on a verdict has been made and the expense distribution; Distribution is made according to the equation below:

$$q_i = Q \times \frac{A_i \times T_i \times X_i}{\sum A_i \times T_i \times X_i}$$

Q: the total compensation loss or gain of a case;
$A_i$: the loss or gain range of the i-th individual in a case;
$T_i$: the cumulative action time of the loss or gain range of the i-th individual in a case;
$X_i$: the matching coefficient within the loss or gain range of the i-th individual in a case and the cumulative action time;
$E_i$: the completion effect of an action within the loss or gain range of the i-th individual in a case and the cumulative action time;
$F_i$: the rated completion effect of an action within the loss or gain range of the i-th individual in a case and the cumulative action time; $X_i = E_i/F_i$
$\Sigma A_i \times T_i \times X_i$: i=1 to n, wherein n is the total number of all individuals.
$q_i$: the paid responsibility or consumption or distribution distributed to the i-th individual in a case.

For example, Company A produces patented products a, and sells 200 units in one region, making a profit of 1 million yuan. Company B produces counterfeit patented products a, and sells 200 units in another two regions, making a profit of 6 million yuan in a period that is half of that of Company A. The distribution is as follows:

$qA=700*1*1/1*1*1-2*0.5*3=-350$ $qB=700*2*0.5*3/1*1*1-2*0.5*3=1050$

Company A deserves −350 and actually gets 100, and Company A needs 450−(−350−100) to make a final profit of 550;

Company B deserves 1050 and actually gets −600, and Company A needs 450 (1050−600) to make a final profit of 150.

If Company A produces patented products a, and sells 200 units in one region, making a profit of 4 million yuan, while Company B produces counterfeit patented products a, and sells 200 units in another two regions, making a profit of 2 million yuan in a period that is half of that of Company A. The distribution is as follows:

$qA=600*1*1*2/1*1*2-2*0.5*1=1200$ $qB=600*2*0.5*1/1*1*2-2*0.5*1=-600$

Company A deserves 1200 and actually gets 400, and Company A needs 800 (600+200) to make a final profit of 1200;

Company B deserves −600 and actually gets −200, and Company A needs −800 (−600−200) to make a final profit of −600.

10. With the device and method for fair metering according to the present invention, the network terminal management department can set the minimum or maximum temperature for each household, control and manage the temperature of each household according to this temperature and meter the basic heat charge by controlling and managing the minimum temperature.

We constantly pursue fair, reasonable and implementable heat metering and management from charging by area, metering and charging with household meters, charging according to the on-off time area method-based principle till to the heat meter method based and the on-off time area method based distribution, metering and charging according to the matching coefficient principle and the principle of equal comfort and equal charging. These more and more detailed, fair and reasonable distribution principles in the physical world, if applied to other political, economic and military fields, can also play a fair and reasonable effect and help and orient the metering, distribution and management in these fields.

The preferred specific embodiments of the present invention are described in detail above. It should be understood that those skilled in the art can make many modifications and changes according to the concept of the present invention without innovative work. Therefore, where involving the distribution and metering of limited resources and work quantity in the technical field or related fields, the technical solutions and results obtained by those skilled in the art through logical analysis, reasoning or limited experimental calculation on the basis of the prior art according to the concept of the present invention shall be under the protection of the scope determined by the claims.

What is claimed is:

1. A metering and distribution method based on a matching coefficient, comprising the steps of: regulating a room temperature by means of an on-off controller based on a heat allocation by heating on-off time and heating area measurement, wherein a heat measured in the heat meter for a building is distributed to heat consumers according to a cumulative opening time based on an on-off control valve (ratio), the building area and a ratio (matching coefficient) of radiator power to design heat load of the heat consumers, as shown in the equation below:

$$q_i = Q \times \frac{A_i \times T_i \times X_i}{\sum A_i \times T_i \times X_i}$$

Q: a total heat metered by a master meter at a building entrance in a set period of time (kw·h);

$A_i$: an area of an i-th household (room) in the building (m2);

$T_i$: a cumulative opening temperature control time of an entrance valve of an i-th household (room) in the building in a corresponding period of time (h or time ratio);

$X_i$: a ratio of the power of the heating equipment to the design load of the i-th household (room) in the building in the corresponding period of time, that is the matching coefficient;

$$X_i = E_i/F_i$$

$E_i$: a radiating power of the heating equipment of the i-th household (room) in the building in the corresponding period of time (kw·h);

$F_i$: a design heat load of the i-th household (room) in the building (kw·h);

$q_i$: a metered and distributed heat quantity of the i-th household (room) in the building in the corresponding period of time (kw·h);

$\Sigma A_i \times T_i \times X_i$: i=1 to N, wherein N is a total number of household (rooms) in the building, $\Sigma A_i \times T_i \times X_i$ refers to a summation from $A_1 \times T_1 \times X_1$ to $A_N \times T_N \times X_N$.

2. The metering and distribution method according to claim 1, characterized in that: a time required by the master meter to measure the total heat of a fixed unit is taken as a metering period.

3. The metering and distribution method according to claim 2, characterized in that: the metering and distribution method is extended to charge calculation and distribution of the centralized or household heating of other clean energy so that the room temperature is regulated by means of the on-off controller, and the charge of the heat meter is distributed to heat consumers according to the on-off control valve cumulative opening time (ratio), the house area and the ratio (matching coefficient) of radiator power to heat load of the heat consumers, as shown in the equation below:

$$q_{1i} = Q_1 \times \frac{A_i \times T_{1i} \times X_i}{\sum A_i \times T_{1i} \times X_i}$$

$Q_1$: a monetary usage charge of electricity or gas measured by the master meter of the building in the set period of time (yuan);

$A_i$: an area of the i-th household (room) in the building (m²);

$T_{1i}$: a cumulative opening temperature control time of the control valve of the i-th household (room) in the building in the corresponding period of time (h);

$X_i$: the ratio of the power of the heating equipment to the design load of the i-th household (room) in the building in the corresponding period of time, that is the matching coefficient;

$E_i$: the radiating power of the heating equipment of the i-th household (room) in the building in the corresponding period of time (kw·h);

$F_i$: the design heat load of the i-th household (room) in the building (kw·h);

$$X_i = E_i/F_i;$$

$q_{1i}$: the monetary usage charge of electricity or gas distributed to the i-th household (room) in the building in the corresponding period of time (yuan);

in $\Sigma A_i \times T_{1i} \times X_i$: i=1 to n, n is the total number of households in the building, $\Sigma A_i \times T_{1i} \times X_i$ refers to the summation from $A_1 \times T_{11} \times X_1$ to $A_n \times T_{1n} \times X_n$.

4. The metering and distribution method according to claim 2, characterized in that: the metering and distribution method is extended to the metering and distribution of various paid resources and the charge distribution; and distribution is made according to the equation below:

$$q_{2i} = Q_2 \times \frac{A_{2i} \times T_{2i} \times X_{2i} \times X_{2j}}{\sum A_{2i} \times T_{2i} \times X_{2i} \times X_{2j}}$$

$Q_2$: a monetary charge, consumption or distribution of a paid resource or equipment investment in a set period of time;

$A_{2i}$: a volume or value of the i-th individual in a set period of time for a certain charge or consumption or distribution;

$T_{2i}$: a cumulative action time of the i-th individual in a set period of time for a certain charge or consumption or distribution;

$X_{2i}$: a matching coefficient of an item of the i-th individual in a set period of time for a certain charge or consumption or distribution;

$$X_{2i} = E_{2i}/F_{2i}$$

$E_{2i}$: a completion effect of an action of the i-th individual in a set period of time for a certain charge or consumption or distribution;

$F_{2i}$: a rated completion effect of an action of the i-th individual in a set period of time for a certain charge or consumption or distribution;

$X_{2j}$: some other matching coefficient of the i-th individual in a set period of time for a certain charge or consumption or distribution;

$E_{2j}$: the completion effect of some other action of the i-th individual in a set period of time for a certain charge or consumption or distribution;

$F_{2j}$: a rated completion effect of some other action of the i-th individual in a set period of time for a certain charge or consumption or distribution;

in $\Sigma A_{2i} = T_{2i} \times X_{2i} \times X_{2i}$: i=1 to n, wherein n is the total number of all individuals;

$$X_{2i} = E_{2i}/F_{2i};$$

$q_{2i}$: a distributed charge or consumption or distribution in the corresponding period of time of the i-th individual in a set period of time.

5. The metering and distribution method according to claim 2, characterized in that: according to the metering and distribution method, if the radiating equipment power and the design heat load well match, that is, the radiating equipment power is equal to the design heat load, then the matching coefficient is 1, with the calculation as follows:

$$q_i = Q \times \frac{A_i \times T_i}{\sum A_i \times T_i}.$$

6. The metering and distribution method according to claim 2, characterized in that: the metering and distribution method is extended to metering and distribution of various compensations of legal cases for which a final decision on a verdict has been made and the expense distribution; distribution is made according to the equation below:

$$q_{7i} = Q_7 \times \frac{A_{7i} \times T_{7i} \times X_{7i}}{\sum A_{7i} \times T_{7i} \times X_{7i}}$$

$Q_7$: a total compensation loss or gain of a case;
$A_{7i}$: a loss or gain range of the i-th individual in a case;
$T_{2i}$: a cumulative action time of the loss or gain range of the i-th individual in a case;
$X_{7i}$: a matching coefficient of an item within the loss or gain range of the i-th individual in a case and the cumulative action time;

$X_{7i}=E_{7i}/F_{7i}$;

$E_{7i}$: a completion effect of an action within the loss or gain range of the i-th individual in a case and the cumulative action time;
$F_{7i}$: a rated completion effect of an action within the loss or gain range of the i-th individual in a case and the cumulative action time;
in $\Sigma A_{7i} \times T_{7i} \times X_{7i}$: i=1 to n, wherein n is the total number of all individuals;
$q_{7i}$: paid responsibility or consumption or distribution distributed to the i-th individual in a case.

7. The metering and distribution method according to claim 2, characterized in that: with the metering device and method, the network terminal management department sets a minimum or maximum temperature for each household, control and manage the temperature of each household according to the temperature and meter the basic heat charge by controlling and managing the minimum temperature.

8. The metering and distribution method according to claim 1, characterized in that: the heat metering and distribution method is extended to charge calculation and distribution of a centralized or household heating of other clean energy so that the room temperature is regulated by means of the on-off controller, and a monetary usage charge of a building heat meter is distributed to heat consumers according to the on-off control valve cumulative opening time (ratio), the building area and the ratio (matching coefficient) of radiator power to heat load of the heat consumers, as shown in the equation below:

$$q_{1i} = Q_1 \times \frac{A_i \times T_{1i} \times X_i}{\sum A_i \times T_{1i} \times X_i}$$

$Q_1$: the monetary usage charge of electricity or gas measured by the master meter of the building in the set period of time (yuan);
$A_i$: the area of the i-th household (room) in the building (m$^2$);
$T_{1i}$: the cumulative opening temperature control time of the control valve of the i-th household (room) in the building in the corresponding period of time (h);
$X_i$: a ratio of the power of the heating equipment to the design load of the i-th household (room) in the building in the corresponding period of time, that is the matching coefficient;
$E_i$: the radiating power of the heating equipment of the i-th household (room) in the building in the corresponding period of time (kw·h);
$F_i$: the design heat load of the i-th household (room) in the building (kw·h);

$X_i=E_i/F_i$;

$q_{1i}$: the monetary usage charge of electricity or gas distributed to the i-th household (room) in the building in the corresponding period of time (yuan);
$\Sigma A_i \times T_{1i} \times X_i$: i=1 to n, n is the total number of households in the building, $\Sigma A_i \times T_{1i} \times X_i$ refers to the summation from $A_1 \times T_{1i} \times X_1$ to $A_n \times T_{1n} \times X_n$.

9. The metering and distribution method according to claim 1, characterized in that: the metering and distribution method is extended to the metering and distribution of various paid resources and the charge distribution; and distribution is made according to the equation below:

$$q_{2i} = Q_2 \times \frac{A_{2i} \times T_{2i} \times X_{2i} \times X_{2j}}{\sum A_{2i} \times T_{2i} \times X_{2i} \times X_{2j}}$$

$Q_2$: a monetary charge, consumption or distribution of a paid resource or equipment investment in a set period of time;
$A_{2i}$: a volume or value of the i-th individual in a set period of time for a certain charge or consumption or distribution;
$T_{2i}$: a cumulative action time of the i-th individual in a set period of time for a certain charge or consumption or distribution;
$X_{2i}$: a matching coefficient of an item of the i-th individual in a set period of time for a certain charge or consumption or distribution;

$X_{2i}=E_{2i}/F_{2i}$ $E_{2i}$: a completion effect of an action of the i-th individual in a set period of time for a certain charge or consumption or distribution;
$F_{2i}$: a rated completion effect of an action of the i-th individual in a set period of time for a certain charge or consumption or distribution;
$X_{2i}$: some other matching coefficient of the i-th individual in a set period of time for a certain charge or consumption or distribution;
$E_{2i}$: a completion effect of some other action of the i-th individual in a set period of time for a certain charge or consumption or distribution;
$F_{2i}$: a rated completion effect of some other action of the i-th individual in a set period of time for a certain charge or consumption or distribution;
in $\Sigma A_{2i} \times T_{2i} \times X_{2i} \times X_{2j}$: i=1 to n, wherein n is the total number of all individuals;

$X_{2i}=E_{2i}/F_{2j}$;

$q_{2i}$: a distributed charge or consumption or distribution in the corresponding period of time of the i-th individual in a set period of time.

10. The metering and distribution method according to claim 1, characterized in that: according to the metering and distribution method, if the radiating equipment power is equal to the design heat load, then the matching coefficient is 1, with the calculation as follows:

$$q_i = Q \times \frac{A_i \times T_i}{\sum A_i \times T_i}.$$

11. The metering and distribution method according to claim 1, characterized in that: the metering and distribution method is extended to metering and distribution of various compensations of legal cases for which a final decision on a verdict has been made and the expense distribution; distribution is made according to the equation below:

$$q_{7i} = Q_7 \times \frac{A_{7i} \times T_{7i} \times X_{7i}}{\sum A_{7i} \times T_{7i} \times X_{7i}}$$

$Q_7$: a total compensation loss or gain of a case;
$A_{7i}$: a loss or gain range of the i-th individual in a case;
$T_{7i}$: a cumulative action time of the loss or gain range of the i-th individual in a case;
$X_{7i}$: a matching coefficient of an item within the loss or gain range of the i-th individual in a case and the cumulative action time;

$X_{7i} = E_{7i}/F_{7i}$;

$E_{7i}$: a completion effect of an action within the loss or gain range of the i-th individual in a case and the cumulative action time;
$F_{7i}$: a rated completion effect of an action within the loss or gain range of the i-th individual in a case and the cumulative action time;
in $\Sigma A_{7i} \times T_{7i} \times X_{7i}$: i=1 to n, wherein n is the total number of all individuals;
$q_{7i}$: a paid responsibility or consumption or distribution distributed to the i-th individual in a case.

12. The metering and distribution method according to claim 1, characterized in that: with the metering and distribution method, the network terminal management department can set the minimum or maximum temperature for each household, control and manage the temperature of each household according to this temperature and meter the basic heat charge by controlling and managing the minimum temperature.

13. A metering and distribution method based on a matching quantity, characterized in that a product of a ratio of heat meter reading of each household divided by a matching heat load per unit area of each household to heat readings of the household heat meters of the entire building divided by a sum of the matching heat load per unit area of each household and a heat meter reading of a settlement point is taken as a user's distributed heat according to a heat meter method based household metering device, with the heat distribution equation is given below:

$$q_{3i} = Q_3 \times \frac{q_{3mi}/f_{3i}}{\sum q_{3mi}/f_{3i}}$$

$q_{3i}$—a heat distributed to the i-th user (kW·h);
$q_{3mi}$—a heat metered by the heat meter at the entrance of the i-th user (kW·h);
$f_{3i}$: a matching heat load per unit area of the i-th house (room) in the building (kw/m²);
$Q_3$—a total heat metered by the heat meter at the entrance of the building (kW·h); in $\Sigma q_{3mi}/f_{3i}$: i=1 to n, n is a total number of households in the building.

14. The metering and distribution method according to claim 13, characterized in that: a master meter meters a total heat of a fixed unit as one metering and distribution unit, and the master meter meters the total heat of the fixed unit as one metering information transmission cycle.

15. The metering and distribution method according to claim 14, characterized in that: the metering and distribution method is extended to charge calculation and distribution of the household heating of other energy, that each household regulates the room temperature using their own temperature regulating method, and the product of the ratio of electricity or gas meter reading of each household divided by heat load of each household to the readings of the household electricity or gas meters of the entire building divided by the sum of the heat load of each household and the electricity or gas meter reading of a settlement point is taken as the user's distributed heat according to an electricity or gas meter method based household metering device, with the heat distribution equation given below:

$$q_{4i} = Q_4 \times \frac{q_{4mi}/f_{4i}}{\sum q_{4mi}/f_{4i}}$$

$q_{4i}$—an electricity meter or gas meter quantity distributed to the i-th user (kW·h or m³);
$q_{4mi}$—an electricity meter or gas meter quantity metered by the heat meter at the entrance of the i-th user (kW·h or m³);
$f_{4i}$: a matching heat load per unit area of the i-th house (room) in the building (kw/m²);
$Q_4$—a total quantity metered by the electricity meter or gas meter at the entrance of the building (kw·h or m³);
in $\Sigma q_{4mi}/f_{4i}$: i=1 to n, wherein n is the total number of households in the building.

16. The metering and distribution method according to claim 14, characterized in that: the metering and distribution method is extended to the metering and distribution of various paid resources or work quantity in other fields and the charge distribution; and distribution is made according to the equation below:

$$q_{5i} = Q_5 \times \frac{q_{5mi}/f_{5i}}{\sum q_{5mi}/f_{5i}}$$

$q_{5i}$—paid resources or work quantity distributed by a system to the i-th individual;
$q_{5mi}$—paid resources or work metered for and used by the i-th individual;
$f_{5i}$—a first technical index of the unit system of the i-th individual in a system;
$Q_5$—total paid resources or work metered by a system;
in $\Sigma q_{5mi}/f_{5i}$: i=1 to n, wherein n is the total number of individuals in the system.

17. The metering and distribution method according to claim 14, characterized in that: the metering and distribution method is extended to metering and distribution of various compensations of legal cases for which a final decision on a verdict has been made and the expense distribution; distribution is made according to the equation below:

$$q_{6i} = Q_6 \times \frac{q_{6mi}/f_{6i}}{\sum q_{6mi}/f_{6i}}$$

$q_{6i}$—the paid responsibility distributed to the i-th individual in a case;
$q_{6mi}$—a loss or gain of the i-th individual in a case;
$f_{6i}$: a cost of the i-th individual in a system to avoid a case;
$Q_6$—a total compensation loss or gain of a case;
in $\Sigma q_{6mi}/f_{6i}$: i=1 to n, wherein n is the total number of individuals in the system.

18. The metering and distribution method according to claim 13, characterized in that: the metering and distribution method is extended to charge calculation and distribution of the household heating of other energy that each household regulates a room temperature using their own temperature regulating method, and a product of a ratio of electricity or gas meter reading of each household divided by heat load of each household to readings of the household electricity or gas meters of an entire building divided by a sum of the heat load of each household and an electricity or gas meter reading of a settlement point is taken as the user's distributed heat according to an electricity or gas meter method based household metering device with the heat distribution equation given below:

$$q_{4i} = Q_4 \times \frac{q_{4mi}/f_{4i}}{\sum q_{4mi}/f_{4i}}$$

$q_{4i}$—an electricity meter or gas meter quantity distributed to the i-th user (kW·h or m$^3$);

$q_{4mi}$—an electricity meter or gas meter quantity metered by the heat meter at the entrance of the i-th user (kW·h or m$^3$);

$f_{4i}$: a matching heat load per unit area of the i-th house (room) in the building (kw/m$^2$);

$Q_4$—a total quantity metered by the electricity meter or gas meter at the entrance of the building (kw·h or m$^3$);

in $\Sigma q_{4mi}/f_{4i}$: i=1 to n, wherein n is the total number of households in the building.

19. The metering and distribution method according to claim 13, characterized in that: the metering and distribution method is extended to metering and distribution of various paid resources or work quantity in other fields and a charge distribution; and distribution is made according to the equation below:

$$q_{5i} = Q_5 \times \frac{q_{5mi}/f_{5i}}{\sum q_{5mi}/f_{5i}}$$

$q_{5i}$—the paid resources or work quantity distributed by a system to the i-th individual;

$q_{5mi}$—the paid resources or work metered for and used by the i-th individual;

$f_{5i}$: a first technical index of the unit system of the i-th individual in a system;

$Q_5$—a total paid resources or work metered by a system;

in $\Sigma q_{5mi}/f_{5i}$: i=1 to n, wherein n is the total number of individuals in the system.

20. The metering and distribution method according to claim 13, characterized in that: the metering and distribution method is extended to metering and distribution of various compensations of legal cases for which a final decision on a verdict has been made and the expense distribution; distribution is made according to the equation below:

$$q_{6i} = Q_6 \times \frac{q_{6mi}/f_{6i}}{\sum q_{6mi}/f_{6i}}$$

$q_{6i}$—a paid responsibility distributed to the i-th individual in a case;

$q_{6mi}$—a loss or gain of the i-th individual in a case;

$f_{6i}$: cost of the i-th individual in a system to avoid a case;

$Q_6$—a total compensation loss or gain of a case;

in $\Sigma q_{6mi}/f_{6i}$: i=1 to n, wherein n is the total number of individuals in the system.

* * * * *